United States Patent [19]
Katritzky et al.

[11] Patent Number: 4,841,021
[45] Date of Patent: Jun. 20, 1989

[54] POLYPYRIDINIUM

[75] Inventors: Alan R. Katritzky, Gainesville, Fla.; Larry R. Krepski, White Bear Lake, Minn.; Jerald K. Rasmussen, Stillwater, Minn.; Steven M. Heilmann, Afton, Minn.; Richard D. Tarr, Toledo, Ohio

[73] Assignee: Minnesota Mining and Manufacturing Company, St. Paul, Minn.

[21] Appl. No.: 126,590

[22] Filed: Nov. 30, 1987

[51] Int. Cl.[4] .............................................. C08G 33/02
[52] U.S. Cl. ..................................... 528/407; 528/44; 528/73; 528/335; 528/341; 528/408; 528/417; 528/423
[58] Field of Search ................... 528/407, 423, 44, 73, 528/335, 408, 417

[56] References Cited

U.S. PATENT DOCUMENTS

| | | | |
|---|---|---|---|
| 3,641,034 | 2/1972 | Simon | 260/296 |
| 3,694,384 | 9/1972 | Factor et al. | 260/2.2 |
| 3,810,845 | 5/1974 | Chapuriat et al. | 528/423 |
| 3,856,714 | 12/1974 | Moore et al. | 260/2 |
| 4,119,581 | 10/1978 | Rembaum et al. | 521/27 |

OTHER PUBLICATIONS

C. L. Bird, A. T. Kuhn, "Electrochemistry of the Viologens", *Chem. Soc. Rev.*, 1981, 10, 49.
T. Endo, K. Ageishi, M. Okawara, *J. Org. Chem.*, 1986, 51, 4309.
I. Okura, H. Fujie, S. Aono, T. Kita and N. Kaji, *Bull. Chem. Soc. Jpn.*, 1986, 59, 309.
Sanada et al., *Nippon Kagaki Kaishi*, 1974 (5), 961 (*Chem. Abstr.* 1974, 81, 106154r).
Sherle et al., *Vysokomol. Soedin.*, A, 1974, 16(a), 2051 (*Chem. Abstr.* 1975, 82, 86976a).
Ger. Offen. 2,544,841 (*Chem. Abstr.*, 1977, 86, 24443y).
Japan. Kokai, 77,155,528 (1976) (*Chem. Abstr.*, 1978, 89, 207248v).
A. Factor, G. E. Heinsohn, *J. Polym. Sci. Polymer Lett. Ed.*, 1971, 9, 289.
M. S. Simon, P. T. Moore, *J. Polym. Sci., Polym. Chem. Ed.*, 1975, 13, 1.
A. R. Katritzky, R. H. Manzo, J. M. Lloyd, R. C. Patel, *Angew. Chem. Int. Ed.* (*English*), 1980, 19, 306.
Dzareva, et al., *Khim. Geterotsikl. Soedin.*, 1955 (9), 1268 (*Chem. Abstr.*, 1986, 104, 169303c).

*Primary Examiner*—Harold D. Anderson
*Attorney, Agent, or Firm*—Donald M. Sell; Walter N. Kirn; Lorraine R. Sherman

[57] ABSTRACT

A novel class of polymers comprises one or more dipyridinium units, having the formula

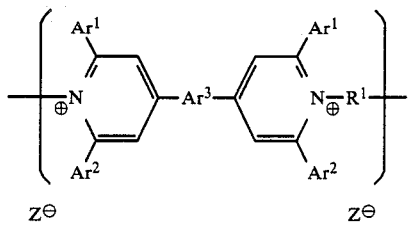

contained within the main polymer backbone where $Ar^1$, $Ar^2$, and $Ar^3$ are aromatic or heteroaromatic nuclei each of which can consist of one ring or two fused or catenated rings having 5 to 12 ring carbon and heteroatoms which can include 1 to 3 unitary heteroatoms selected from S, N and O, $R^1$ is any divalent organic bridging group, and $Z^\ominus$ is a counterion.

10 Claims, No Drawings

POLYPYRIDINIUM

FIELD OF THE INVENTION

This invention relates to novel polymers containing the pyridinium ring system and to novel methods for their preparation. The polymers are useful as polyelectrolytes, antistatic agents, redox polymers, ion exchange polymers, and electrochromic materials for light filtering and other applications.

BACKGROUND OF THE INVENTION

The 1,1'-disubstituted-4,4'-dipyridinium salt, also know as a "viologen" (Formula I) possesses one of the lowest cathodic reduction potentials of any organic system showing significant reduction-oxidation (redox) potential reversibility. The colorless salt form shown in Formula I can accept an electron and thereby be reduced to a deep blue-violet colored delocalized radial cation of Formula II. The radical cation of Formula II is readily oxidized back to the dicationic form of Formula I, for example, by atmospheric oxygen. Alternatively, the radical cation of Formula II can be further reduced to the red colored neutral form of Formula III, which can also be oxidized back to the starting dicationic form of Formula I.

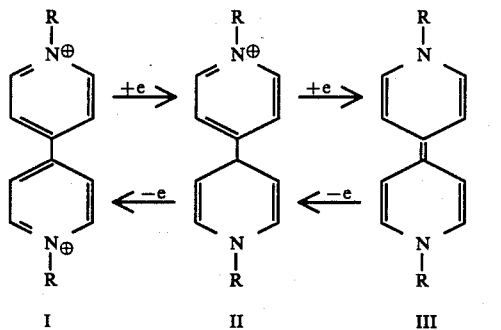

Because of this remarkable redox behavior, viologens have been extensively used as photochemical or redox indicators in both chemical and biochemical applications. Additionally, viologens have been used for the estimation of dissolved oxygen in biochemical applications and as the main components of electrochromic display devices. See, for example, C. L. Bird and A. T. Kuhn, "Electrochemistry of the Viologens", *Chem. Soc. Rev.* 1981, 10, 49.

Particularly significant is the ability of viologens to function as electrochemical mediators, in that the viologen of Formula I can be electrochemically reduced to the radical cation of Formula II, and this radical cation can then reduce species which, under the conditions of the reaction, are not themselves susceptible to electrochemical reduction. For example, T. Endo, K. Ageishi, and M. Okawara in *J. Org. Chem.* 1986, 51, 4309 describe the zinc induced reduction of acrylonitrile in the presence of viologen derivatives. The electrochemical mediating ability of viologens has also been demonstrated to have applications in the catalytic photolysis of water where light is converted into chemical energy (I. Okura, H. Fujie, S. Aono, T. Kita, and N. Kaji, *Bull Chem. Soc. Jpn.* 1986, 59, 309).

These pyridinium salts or viologens of Formula I have also been incorporated into polymers with the intent of taking advantage of the useful properties of the dipyridinium unit but in a material form that is easier to handle and separate from other components of the system, and to fabricate into desirable forms such as films, fibers, or membranes. For example, U.S. Pat. Nos. 3,641,034 (1972), 3,694,384 (1972), and 3,856,714 (1974) teach the incorporation of dipyridinium units into the main chain of polymers for use as redox polymers and electrochromic light filtering devices. Electrically conductive complexes of pyridinium polymers and 7,7',8,8'-tetracyanoquinodi-methane (TCNQ) are described by Sanada, et al, *Nippon Kagaka Kaishi* 1974, (5), 961 (*Chem. Abstr.* 1974, 81, 106154r), and by Sherle, et al., *Vysokomol. Soedin., Ser. A* 1974, 16(a), 2051 (*Chem. Abstr.* 1975, 82, 86976a). Pyridinium polymers useful as nonfoaming antistatic agents for the antistatic treatment of film are described in Ger. Offen. No. 2,544,841 (*Chem. Abstr.* 1977, 86, 24443y). Incorporation of pyridinium polymers into ion-exchange membranes is disclosed in U.S. Pat. No. 4,119,581 (1978), and use of pyridinium polymers as mordants in color diffusion transfer photography is taught in Japan. Kokai No. 77,155,528 (1976) (*Chem. Abstr.* 1978, 89, 207248v).

In general, these pyridinium polymers where the pyridinium unit is contained in the main chain or backbone of the polymer are prepared by a Menschutkin type reaction, that is, condensation of 4,4'-dipyridyl with an α, ω-dihaloalkane (See, A. Factor and G. E. Heinsohn, *J. Polym. Sci. Polymer Lett. Ed.* 1971, 9, 289.), for example:

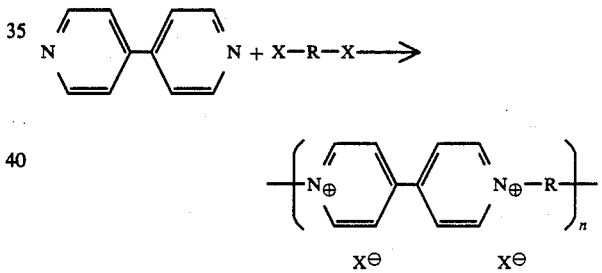

Although this method does afford the desired useful pyridinium polymers, it has been reported (M. S. Simon and P. T. Moore, *J. Polym. Sci., Polym. Chem. Ed.* 1975, 13, 1) that films cast of the polymers obtained from this type of Menschutkin reaction were brittle and difficult to work with.

As an alternative to the Menschutkin reaction (that is, alkylation of an existing pyridine ring) another method for the preparation of pyridinium compounds is to utilize the reaction of a pyrylium salt (IV) with an amine (see A. R. Katritzky, R. H. Manzo, J. M. Lloyd, and R. C. Patel, *Angew. Chem. Int. Ed.* (*English*) 1980, 19, 306):

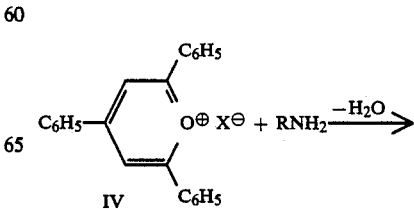

-continued

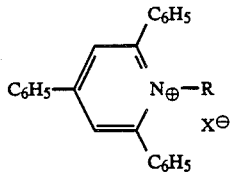

An example of the use of a bis(pyrylium) salt of structure V to prepare a polypyridinium of structure VI has been reported: Dzaraeva, et al., *Khim. Geterotsikl. Soedin.* 1985, (9), 1268 (*Chem. Abstr.* 1986, 104, 169303c).

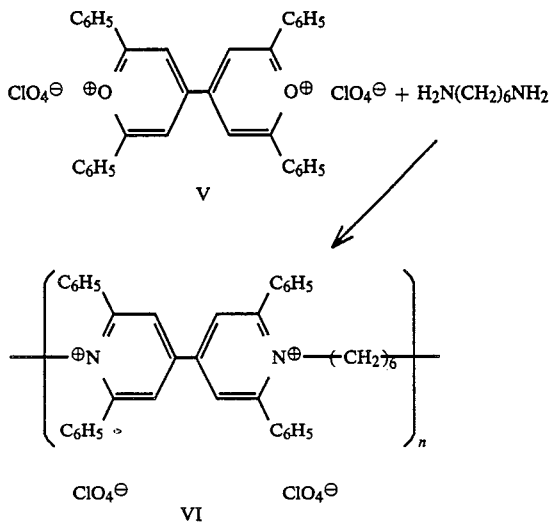

SUMMARY OF THE INVENTION

Briefly, the present invention provides a class of polymers comprising one or more dipyridinium units, having the Formula

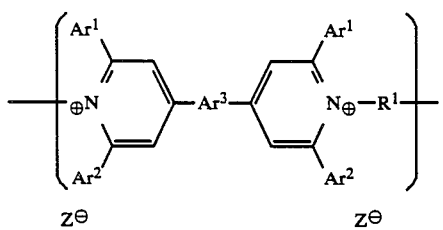

contained within the main polymer backbone wherein $Ar^1$, $Ar^2$, and $Ar^3$ are aromatic or heteroaromatic groups each of which can consist of one ring or two fused or catenated rings having 5 to 12 ring carbon and heteroatoms which can include 1 to 3 unitary heteroatoms selected from S, N, and O, and $Z^\ominus$ is a counterion. The ring carbon atoms of $Ar^1$, $Ar^2$, and $Ar^3$ can be substituted by halogen atoms, and $C_1$-$C_{10}$ alkyl, $C_1$-$C_{10}$ alkoxy, N,N-di($C_1$-$C_{10}$ alkyl)amino, nitro, cyano, $SO_3^\ominus$, and trifluoromethyl groups and $R^1$ can be any divalent organic bridging group, such as an alkylene group having 2 to 20 carbon atoms, or an arylene group having 2 to 20 carbon atoms, or a polyoxyalkylene group such as the polyoxyethylene and polyoxypropylene oligomeric residues of the polyethylene and polypropyleneoxide based diamines which are available from Texaco Chemical (Bellaire, Tex.) under the trade name Jeffamine™.

The novel pyridinium unit-containing polymers of the present invention are the reaction products of one or more bis(pyrylium) salts with one or more diamines.

In this application:

"bis(pyrylium) salt" means a compound of general Formula VIII

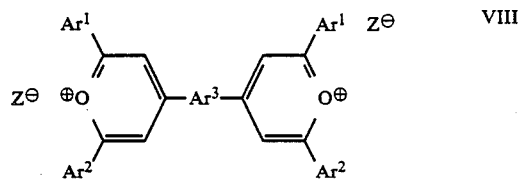

wherein $Ar^1$, $Ar^2$, and $Ar^3$ are as defined above. It will be recognized that associated with the two positively charged oxygen atoms of the bis(pyrylium) salt of Formula VIII will be two negatively charged counterions, designated $Z^\ominus$, which are nonreactive with the bis(pyrylium) salt, so as to render the bis(pyrylium) salt of Formula VIII electrically neutral. Preferably, $Z^\ominus$ is non-nucleophilic. These counterions may be free counterions, for example, $BR_4^\ominus$, $ClO_4^\ominus$, $PF_6^\ominus$, $SbF_6^\ominus$, or may be negatively charged substituents on $Ar^1$, $Ar^2$, or $Ar^3$, for example, $SO_3^\ominus$ groups;

"diamine" means a compound of general Formula IX $$H_2N-R^1-NH_2 \qquad \text{IX}$$

wherein $R^1$ is as previously defined.

"polymer" means a compound having more than one repeating unit, including oligomers (compounds having 2 to 5 repeating units);

"backbone" means the main chain of the polymer;

"alkyl" and "alkylene" mean the monovalent or divalent residues remaining after removal of one or two hydrogen atoms, respectively, from a linear, or branched chain or cyclic hydrocarbon having 1 to 20 carbon atoms;

"aryl" and "arylene" mean the monovalent or divalent residues remaining after removal of one or two hydrogen atoms, respectively, from an aromatic or heteroaromatic compound which can consist of one ring or two fused or catenated rings having 5 to 12 ring atoms which can include up to 3 unitary heteroatoms selected from S, N, and O. The carbon atoms can be substituted by halogen atoms, and $C_1$-$C_{10}$ alkyl, $C_1$-$C_{10}$ alkoxy, and N,N-di($C_1$-$C_4$ alkyl)amino groups;

"arenyl" and "arenylene" mean the monovalent or divalent residues remaining after removal of one or two hydrogen atoms, respectively, from the alkyl portion of a hydrocarbon containing both alkyl and aryl groups having 6 to 26 carbon and up to 3 unitary heteroatoms selected from S, N, and O; and "catenary" means in the polymer backbone.

DETAILED DESCRIPTION OF THE INVENTION

The present invention provides novel polymers comprising one or more dipyridinium units,

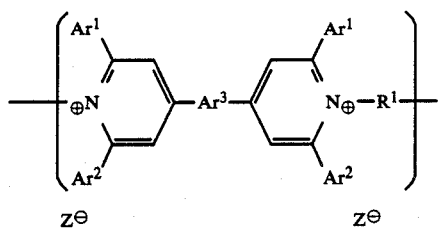

wherein $Ar^1$, $Ar^2$, $Ar^3$, $R^1$, and $Z^\ominus$ are as defined above, contained within the main polymer backbone. These polymers are prepared by reacting one or more bis(pyrylium) salts of general Formula VIII

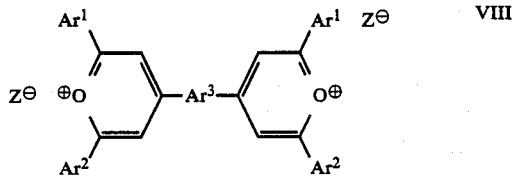

wherein $Ar^1$, $Ar^2$, $Ar^3$, and $Z^\ominus$ are as defined above with one or more diamines of general Formula IX

wherein $R^1$ can be any divalent organic bridging group, such as an alkylene group having 2 to 20 carbon atoms, or an arylene group having 2 to 20 carbon atoms; a polyoxyalkylene group having a number average molecular weight up to 20,000 such as the polyoxyethylene and polyoxypropylene oligomeric residues of the polyethylene- and polypropyleneoxide based diamines which are available from Texaco Chemical (Bellaire, Tex.) under the trade name Jeffamine ™; or a 36 carbon residue of the linoleic acid dimer based diamines such as those available from Humko Sheffield chemical (Memphis, Tenn.) under the trade name Kemamine ™; and polysiloxane diamines such as those described by I. Yilgor et al., *Polymer Preprints* 1983, 24(1), 167.

The diamines of general Formula IX are well known in the art. Many of them are commercially available and include 1,2-ethylenediamine, 1,3-propylenediamine, 1,4-butanediamine, 1,6-hexanediamine, 1,8-octanediamine, 1,12-dodecanediamine, m-phenylenediamine, p-phenylenediamine, 1,5-diaminonaphthalene, 3-aminophenyl sulfone, 4-aminophenyl sulfone, 4,4'-diaminooctafluorobiphenyl, 4,4'-methylenedianiline, benzidine, 4-aminophenyl ether, and 4-aminophenyl sulfide, oligomeric amines such as diethylenetriamine, triethylenetetramine, tetraethylenepentamine, 3,3-iminobispropylamine, 1,5-bis(3-aminopropyl)-1,1,3,3,5,5-hexamethyltrisiloxane, oxybisethylamine, and 4,9-dioxa-1,12-dodecanediamine.

It is to be understood that associated with each positively charged nitrogen atom of the dipyridinium unit of Formula VII or the positively charged oxygen atoms of the bis(pyrylium) salt of general Formula VIII will be a negatively charged counterion species so as to render the salt electrically neutral. This counterion species may be a free counterion, such as $BF_4^\ominus$ or $ClO_4^\ominus$, or it may be a negatively charged substituent on $Ar^1$, $Ar^2$, or $Ar^3$, for example, a $SO_3^\ominus$ group or a $CO_2^\ominus$ group.

Bis(pyrylium) salts of general Formula VIII are known in the art. The bis(pyrylium) salts of Formula VIII where $Ar^1 = Ar^3$ can be prepared by base catalyzed condensation of a dialdehyde, OCH—$Ar^3$—CHO with an excess of an aryl ketone wherein $Ar^1$, $Ar^2$, and $Ar^3$ are as defined above. The resulting tetraketone is converted to the bis(pyrylium) salt by the action of a strong acid such as perchloric acid, triflic acid ($CF_3SO_2OH$), fluoboric acid, hexafluorophosphoric acid, and hexafluoroantimonic acid, or by the action of a hydride ion abstractor such as triphenylmethyl tetrafluoroborate:

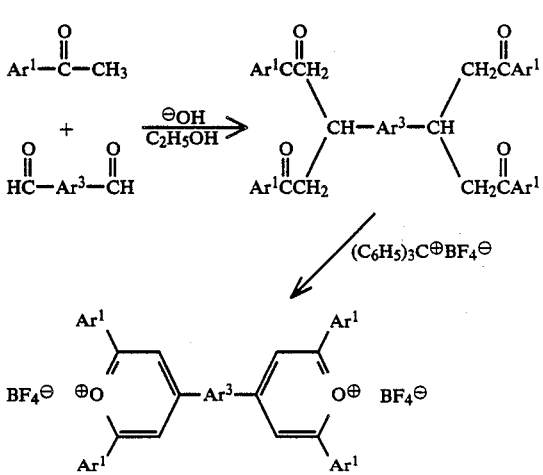

wherein $Ar^1$, and $Ar^3$ are as defined previously.

A number of bis(pyrylium) salts of Formula VIII where $Ar^1 = Ar^2$ were reported by Krivun and Dorofeenko, *Khim. Geterotsikl. Soedin.* 1966 (5), 656 (*Chem. Abstr.* 1967, 67, 64170w). Bis(pyrylium) salts of Formula VIII where $Ar^1$ is not the same as $Ar^2$ can be prepared by first preparing a bis(chalcone) by condensing a dialdehyde, OHC—$Ar^3$—CHO, with 2 equivalents of an aryl ketone, and then reacting the bis(chalcone) with a different aryl ketone (see Example 8 below for details of process and conditions):

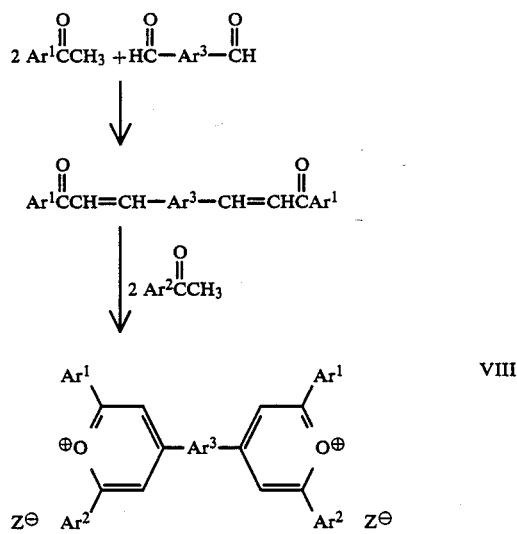

wherein $Ar^1$, $Ar^2$, $Ar^3$, and $Z^\ominus$ are as previously defined.

Preparation of polypyridinium homopolymers takes place according to Flow Chart I. Representative examples of bis(pyrylium) salts of general Formula VIII, diamines of general Formula IX, and the resultant polypyridiniums of general Formula VII include those indicated in TABLE I.

dimethyl sulfoxide, and sulfolane. The reaction is generally conducted at temperatures in the range of 25°–100° C. for 1 to about 48 hours, then an acid is added and the reaction is allowed to continue at the same temperature

TABLE I
FLOW CHART I

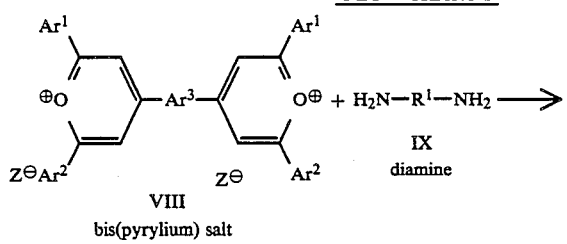

VIII
bis(pyrylium) salt

+ $H_2N-R^1-NH_2$ ⟶

IX
diamine

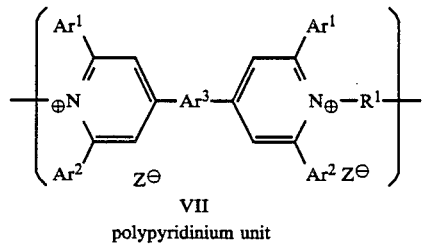

VII
polypyridinium unit

| $Ar^1$ | $Ar^2$ | $Ar^3$ | counterion $Z^\ominus$ | $R^1$ |
|---|---|---|---|---|
| $C_6H_5$ | $C_6H_5$ | p-$C_6H_4$ | $BF_4^\ominus$ | $(CH_2)_6$ |
| $C_6H_5$ | $C_6H_5$ | m-$C_6H_4$ | $ClO_4^\ominus$ | $(CH_2)_8$ |
| $C_6H_5$ | $C_6H_5$ | (thiophene-2,5-diyl) | $ClO_4^\ominus$ | $(CH_2)_{12}$ |
| (thiophen-2-yl) | (thiophen-2-yl) | p-$C_6H_4$ | $BF_4^\ominus$ | (p-$C_6H_4)_2CH_2$ |
| 3,5-$(CH_3O)_2C_6H_3$ | 3,5-$(CH_3O)_2C_6H_3$ | m-$C_6H_4$ | $ClO_4^\ominus$ | (p-$C_6H_4)_2O$ |
| $C_6H_5$ | 3,5-$(CH_3O)_2C_6H_3$ | p-$C_6H_4$ | $BF_4^\ominus$ | $(CH_2)_6$ |
| $C_6H_5$ | 4-$(SO_3^\ominus)C_6H_4$ | p-$C_6H_4$ | —* | (p-$C_6H_4)_2O$ |
| $C_6H_5$ | 4-$CH_3OC_6H_4$ | m-$C_6H_4$ | $BF_4^\ominus$ | p-$(C_6H_4)_2O$ |
| 4-$CH_3C_6H_4$ | 4-$(SO_3^\ominus)C_6H_4$ | m-$C_6H_4$ | —* | (p-$C_6H_4)_2SO_2$ |
| 4-$CF_3C_6H_4$ | $C_6H_5$ | p-$C_6H_4$ | $BF_4^\ominus$ | $(CH_2)_6$ |
| 4-$(SO_3^\ominus)C_6H_4$ | 4-$(Na^+SO_3^\ominus)C_6H_4$ | (thiophene-2,5-diyl) | —* | (p-$C_6H_4)_2O$ |
| $C_6H_5$ | 4-$CH_3C_6H_4$ | (thiophene-2,5-diyl) | $BF_4^\ominus$ | $(CH_2)_6$ |
| $C_6H_5$ | 4-$CH_3C_6H_4$ | p-$C_6H_4$ | $BF_4^\ominus$ | $((CH_2)_3Si(CH_3)_2)_2O$ |
| $C_6H_5$ | 4-$(SO_3^\ominus)C_6H_4$ | p-$C_6H_4$ | —* | $((CH_2)_3Si(CH_3)_2)_2O$ |

—*counterion is negatively charged substituent of $Ar^2$

The reaction to prepare the novel polymers of the invention is carried out by mixing, preferably, equimolar amounts of the bis(pyrylium) salt of Formula VIII, the diamine of Formula IX and an organic base such as an amine or aza compound, for example triethylamine, diisopropylethylamine, 1,5-diazabicyclo[4.3.0]non-5-ene, 1,4-diazabicyclo[2.2.2]octane, 1,8-diazabicyclo[5.4.0]undec-7-ene, or 1,5,7-triazabicyclo[4.4.0]dec-5-ene in a nonreactive organic solvent. Suitable organic solvents include o-, m-, and p-cresol, methylene chloride, chloroform, dimethylformamide, dimethylacetamide, N-methylpyrrolidone, N-cyclohexylpyrrolidone, for 1 to about 48 hours. The amount of acid added is usually in excess relative to the amount of organic base. Generally two equivalents of acid are added. Suitable acids include any acid that is soluble in the reaction mixture and include strong acids such as triflic acid, hydrochloric acid and sulfuric acids, although organic carboxylic acids such as acetic acid, trifluoroacetic acid and propionic acid are preferred.

Upon completion of the reaction, the reaction mixture is added to a nonsolvent, such as diethyl ether, and the resultant precipitated polymer is isolated by filtration of the mixture.

It is also possible to prepare copolymers containing the bis(pyridinium) salt unit of Formula VII

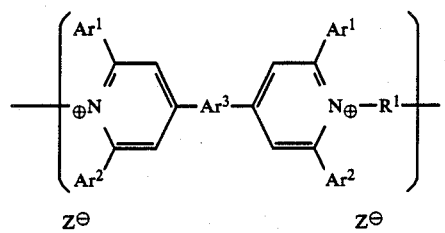

VII wherein $Ar^1$, $Ar^2$, $Ar^3$, $R^1$, and $Z^\ominus$ are as previously defined, by substituting a different monomer (comonomer) for a portion of the bis(pyrylium) salt component of Formula VIII. Suitable comonomers include any difunctional monomers which can react with the diamines of Formula IX, for example, diisocyanates, diacids, diacid chlorides, diesters, and bis(azlactones)

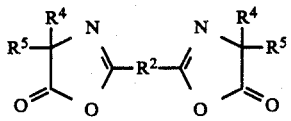

wherein $R^2$ is a single bond or a hydrocarbon group selected from alkylene groups of 1 to 16 carbon atoms, arylene groups of 5 to 12 ring atoms, and arenylene groups of 6 to 26 carbon and heteroatoms, or $R^2$ can be 2 to 8 alkylene, arylene, and arenylene groups joined by up to 7 unitary catenary heteroatoms selected from —O—, —S—, and $$-\underset{\underset{R^3}{|}}{N}-$$

wherein $R^3$ is hydrogen or alkyl of 1 to 8 carbon atoms or an aryl group; and $R^4$ and $R^5$ independently represent a hydrogen atom, an alkyl group of 1 to 16 carbon atoms, an aryl group of 5 to 12 ring atoms, or an arenyl group of 6 to 26 carbon and heteroatoms, or $R^4$ and $R^5$ taken together with the carbon atom to which they are joined form a carbocyclic ring of 4 to 12 ring atoms. Representative examples of useful comonomers include: the diisocyanates such as OCN—$R^6$—NCO, wherein $R^6$ can be any divalent organic bridging group, an alkylene group having 2 to 36 carbon atoms or an arylene group having 2 to 36 carbon atoms, such as 1,6-hexanediisocyanate, toluene diisocyanate, diphenylmethanediisocyanate, isophoronediisocyanate, and the like; the diacids (or their corresponding acid chlorides or lower alkyl ($C_1$ or $C_2$) esters) of oxalic acid, malonic acid, adipic acid, azelaic acid, sebacic acid, terephthalic acid, isophthalic acid, and the like; and the bis(azlactones) which are described in the following articles, herein incorporated by reference: (a) C. S. Cleaver and B. C. Pratt, *J. Am. Chem. Soc.* 1955, 77, 1544; (b) L. D. Taylor, T. E. Platt, and M. H. Mach, *J. Polym. Sci., Polym. Letters* 1970, 8, 537; (c) R. D. Katsarara, et al., *Acta Polym.* 1985, 36, 29; and those bis(azlactones) described in U.S. Pat. No. 4,291,152 (Inata, et al.) and in U.S. Pat. No. 4,485,236, also incorporated herein by reference.

Flow Chart II shows the preparation of exemplary copolymers.

FLOW CHART II

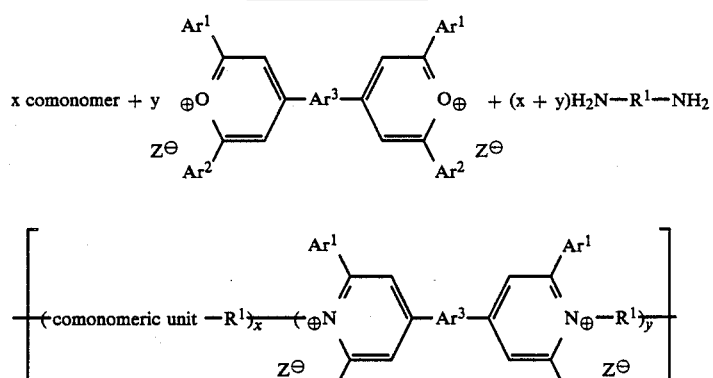

wherein $Ar^1$, $Ar^2$, $Ar^3$, $R^1$, and $Z^\ominus$ are as previously defined and x and y are mole fractions of units derived from comonomer and bis(pyrylium) salt, respectively.

| Comonomer | Comonomeric Unit |
|---|---|
| OCN—$R^6$—NCO (diisocyanate) | $-\text{NHCNHR}^6\text{NHCNH}-$ with two C=O |
| $HO_2C$—$R^6$—$CO_2H$ (diacid (or corresponding diacid chloride or diester)) | $-\text{NHC}-R^6-\text{CNH}-$ with two C=O |

-continued

| Comonomer | Comonomeric Unit |
|---|---|
| bis(azlactone) [structure with $R^4$, $R^5$, $R^2$, N, O groups] | $-NHC(=O)-C(R^4)(R^5)-NHC(=O)-R^2-C(=O)NHC(R^4)(R^5)-C(=O)NH-$ |

The polypyridiniums of the present invention are useful as redox polymers, polyelectrolytes, antistatic agents, ion exchange polymers, and electrochromic materials for light filtering. The polymers can be reduced chemically to the highly colored radical cation forms, then subsequently reoxidized to the color of the starting form, suggesting applications as redox indicators or light filtering materials. Light yellow solutions of the polymers in DMSO turned deep blue when treated with aqueous sodium dithionite. The blue color was discharged upon exposure of the polymer solutions to atmospheric oxygen.

Objectives and advantages of this invention are further illustrated by the following examples, but the particular materials and amounts thereof recited in these examples, as well as other conditions and details, should not be construed to unduly limit this invention. In all cases reactions were conducted under inert atmosphere of argon or nitrogen.

EXAMPLE 1

4,4'-(1,4-Phenylene)bis(2,6-diphenylpyrylium) bis(-tetrafluoroborate) was prepared as follows: To a solution of terephthaldehyde (0.40 mol) and acetophenone (2.4 mol) in ethanol (1.2 L) was added a solution of potassium hydroxide (0.50 mol) in water (100 mL). The solution was heated at reflux for 24 hours. The product, 1,4-bis(1,5-dioxo-1,5-diphenylpentan-3-yl)benzene, was collected by filtration, washed with ethanol (1 L), and dried. Fluoboric acid (0.11 mol) was added over a 30 minute period to a solution of triphenylmethanol (0.11 mol) in acetic anhydride (500 mL). Stirring was continued for 2 hours after addition was complete, then 1,4-bis(1,5-dioxo-1,5-diphenylpentan-3-yl)benzene (0.05 mol) was added and the mixture heated at reflux for 1 hour. The reaction mixture was cooled to room temperature, filtered, and the collected bis(pyrylium) salt was washed with acetone (250 mL) and dried at 50° C. at reduced pressure overnight.

A solution of 4,4'-(1,4-phenylene)bis(2,6-diphenylpyrylium) bis(tetrafluoroborate) (10 mmol), ethylenediamine (10 mmol) and triethylamine (10 mmol) in DMF (75 mL) was stirred at room temperature for 24 hours, then acetic acid (20 mmol) was added and stirring was continued for another 24 hours. The reaction mixture was added to ether to precipitate the polymer which was isolated by filtration. The polymer was washed with ether and water, then dried at 50° C. at reduced pressure to give 4.8 g of the polymer, inherent viscosity 0.11 dL/g (in DMF at 30° C.).

EXAMPLES 2-7

Additional polypyridiniums were prepared according to the procedure of Example 1 by allowing the appropriate diamine to react with 4,4'-(1,4-phenylene)-bis(2,6-diphenylpyrylium) bis(tetrafluoroborate). Results are listed in Table II below.

TABLE II
Polypyridiniums

[Structure: repeating unit of polypyridinium with $C_6H_5$ substituents, $N^\oplus$ cations, $BF_4^\ominus$ counterions, and $R^1$ linker]

| Example | $R^1$ | Inherent viscosity (dL/g in DMF at 30° C.) |
|---|---|---|
| 2 | $(CH_2)_6$ | 0.60 |
| 3 | $(CH_2)_8$ | 0.80 |
| 4 | $(CH_2)_{12}$ | 1.4 |
| 5 | $-(C_6H_4)_2-CH_2-$ | 0.50 |
| 6 | $-(C_6H_4)_2-O-$ | 0.60 |
| 7 | $-(C_6H_4)_2-SO_2-$ | 0.50 |

Cyclic voltammetry of the polypyridiniums indicated that the polymers are useful as redox polymers. The polymer of Example 6, for example, when absorbed on glassy carbon and analyzed by cyclic voltammetry by use of a silver/silver chloride reference electrode and 0.1M $KPF_6$ supporting electrolyte in acetonitrile, showed reversible redox behavior at −720 mV.

EXAMPLES 8-11

4,4'-(1,4-Phenylene)bis[2-phenyl-6-(4'-benzenesulfonato)pyrylium] was prepared as follows: To terephthaldehyde (0.1 mol) and acetophenone (0.2 mol) in ethanol (200 mL) was added a solution of potassium hydroxide (0.2 mol in 50 mL of water) over a 30 minute period. The mixture was stirred at room temperature for 24 hours, filtered, and the product, 1,4-bis(3-oxy-3-phenylprop-1-enyl)benzene, was washed with water and dried at 50° C. at reduced pressure. A mixture of this product (0.025 mol) and sodium 4-acetylbenzenesulfonate (0.05 mol) in boron trifluoride etherate (0.3 mol) was heated at 100° C. for 6 hours, cooled, and added to ether. The product, 4,4'-(1,4-phenylene)bis[2-phenyl-6-(4'-benzenesulfonato)pyrylium], was isolated by filtration, washed with acetone, and dried at 50° C. at reduced pressure.

4,4'-(1,4-Phenylene)bis[2-(4'-methylphenyl)-6-(4'-benzenesulfonato)pyrylium) was prepared in a similar fashion starting from terephthaldehyde and 4-methylacetophenone. Reaction of these bis(pyrylium) salts with the appropriate diamines according to the procedure of Example 1 gave the polypyridiniums listed in TABLE III.

TABLE III
Polypyridiniums

| Example | Ar¹ | Ar²* | R¹ | Inherent viscosity (dL/g in DMF at 30° C.) |
|---|---|---|---|---|
| 8 |  | ⊖O₃S | $(CH_2)_6$ | 0.09 |
| 9 | 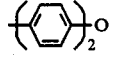 | " | 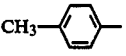 | 0.08 |
| 10 | CH₃—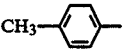 | " | $(CH_2)_6$ | 0.10 |
| 11 | CH₃—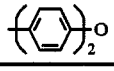 | " | 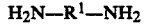 | 0.07 |

*this group includes the counterion

EXAMPLE 12

A solution of 4,4-(1,4-phenylene)bis(2,6-diphenyl-pyrylium) bis(tetrafluoroborate) (5 mmol), m-phenylenebis(4,4-dimethyl-2-oxazolin-5-one) (5 mmol), 1,12-dodecanediamine (10 mmol), and triethylamine (10 mmol) in DMF (85 mL) was stirred at room temperature for 24 hours, then acetic acid (20 mmol) was added and stirring was continued for another 24 hours. The reaction mixture was added to ether/methanol (3/1, v:v) to precipitate the polymer which was isolated by filtration. The polymer was washed with ether and water, then dried at 50° C. at reduced pressure. Spectral analyses confirmed the structure of the copolymer.

Similarly, copolymers can be prepared by substituting a diisocyanate or a dicarboxylic acid for the bis(a-zlactone) in the above examples.

Various modifications and alterations of this invention will become apparent to those skilled in the art without departing from the scope and spirit of this invention, and it should be understood that this invention is not to be unduly limited to the illustrative embodiments set forth herein.

I claim:

1. A polymer comprising dipyridinium units having the formula:

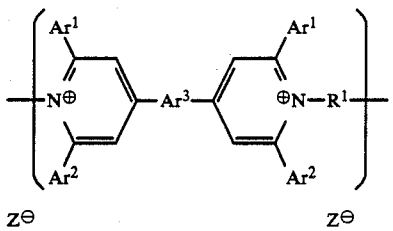

wherein Ar¹, Ar², and Ar³ are the same or different aromatic or heteroaromatic group each of which contains one ring or two fused or catenated rings having 5 to 12 ring carbon or heteroatoms, R¹ is any divalent organic bridging group, and Z⊖ is a counterion.

2. The polymer according to claim 1 wherein said bridging group is selected from the group consisting of an alkylene group having 2 to 20 carbon atoms, an arylene group having 2 to 20 carbon atoms, a polyoxyalkylene group, a dimer acid based group, and a polysiloxane group.

3. The polymer according to claim 1 wherein said heteroatoms of each heteroaromatic group comprises 1 to 3 unitary S, N, or O atoms.

4. The polymer according to claim 1 wherein said ring carbon atoms are substituted by atoms and groups selected from the class consisting of halogen atoms, and $C_1$ to $C_{10}$ alkyl, $C_1$ to $C_{10}$ alkoxy, N,N-di($C_1$ to $C_{10}$ alkyl)amino, nitro, cyano, $SO_3\ominus$, $CO_2\ominus$ and trifluoromethyl groups.

5. A method for preparing a polymer comprising polypyridinium units comprising the steps of:
    (a) reacting a bis(pyrylium) salt having the formula

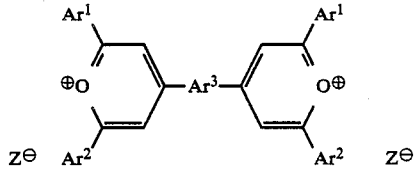

wherein Ar¹, Ar², and Ar³ are the same or different aromatic or heteroaromatic group each of which contains one ring or two fused or catenated rings having 5 to 12 ring carbon or heteroatoms, and Z⁻ is a counterion with a diamine having the formula $H_2N-R^1-NH_2$ wherein R¹ is a divalent organic bridging group, in the presence of an organic base,
    (b) adding acid in excess relative to the amount of organic base present, and
    (c) isolating the resulting polymer comprising polypyridinium units.

6. The method according to claim 5 wherein said bis(pyrylium) salt, said diamine, and said organic base are present in equimolar amounts.

7. The method according to claim 5 wherein said components of step (a) further comprise a nonreactive organic solvent.

8. The method according to claim 5 wherein said acid is added in an amount of 2 equivalents compared to said organic base.

9. The method according to claim 5 wherein said acid is an organic carboxylic acid.

10. The method according to claim 5 wherein said organic base is an amine or aza compound.

* * * * *